2 Sheets--Sheet 1.

J. V. WOOLSEY.
Machines for Sizing Spokes for Wheels.

No. 134,183. Patented Dec. 24, 1872.

Witnesses.
C. Carr
A. F. Cornell.

Inventor.
J. V. Woolsey.
Per. Burridge & Co.
Attys.

2 Sheets--Sheet 2.

J. V. WOOLSEY.

Machines for Sizing Spokes for Wheels.

No. 134,183. Patented Dec. 24, 1872.

Witnesses.
C. Carr.
A. F. Cornell.

Inventor.
J. V. Woolsey.
Per. Burridge & Co.
Attys.

UNITED STATES PATENT OFFICE.

JOHNSTON V. WOOLSEY, OF SANDUSKY, OHIO.

IMPROVEMENT IN MACHINES FOR SIZING SPOKES FOR WHEELS.

Specification forming part of Letters Patent No. 134,183, dated December 24, 1872.

*To all whom it may concern:*

Be it known that I, JOHNSTON V. WOOLSEY, of Sandusky, in the county of Erie and State of Ohio, have invented a certain new and Improved Machine for Sizing Spokes; and I do hereby declare that the following is a full, clear, and complete description thereof, reference being had to the accompanying drawing making part of the same.

Figure 1:
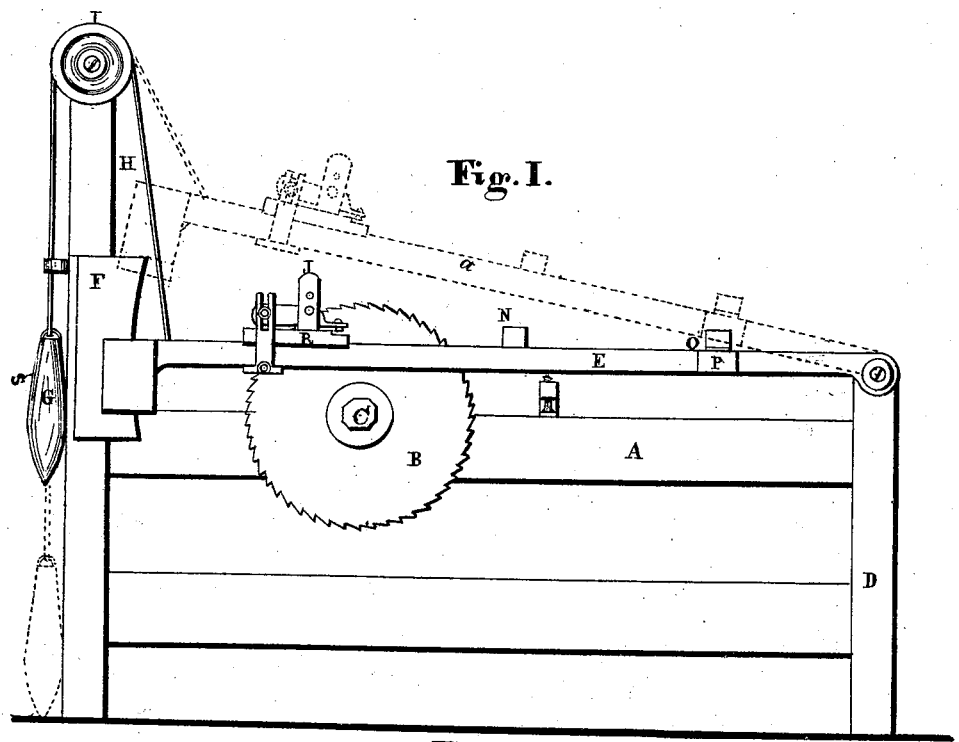
Figure 2:
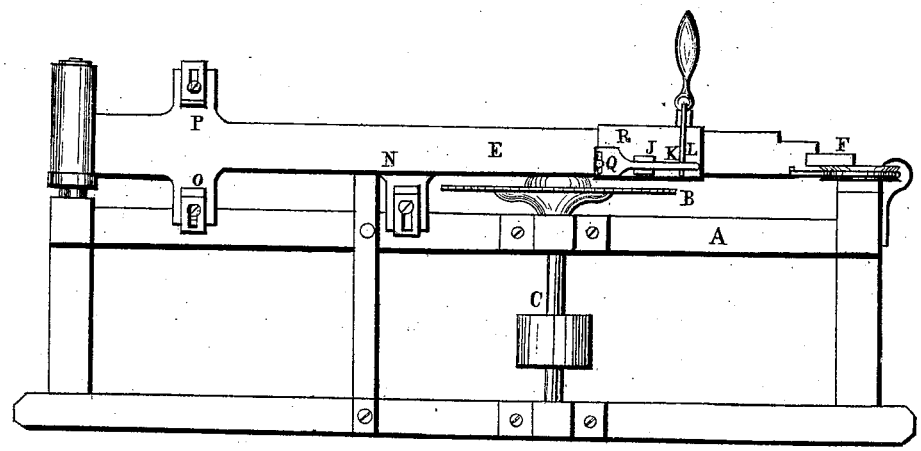
Figure 3:
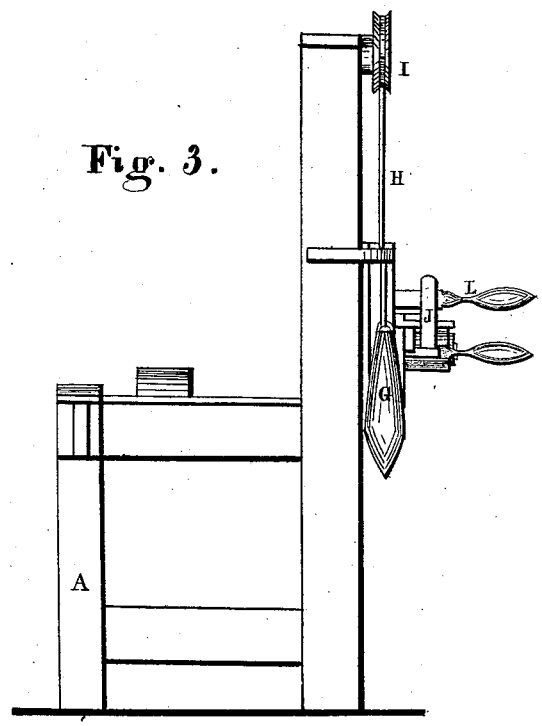
Figure 4:
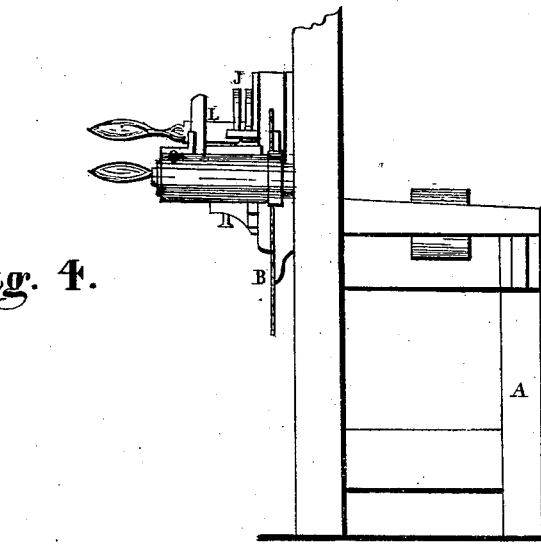

Figure 1 is a side elevation of the machine. Fig. 2 is a plan view. Fig. 3 is an end elevation. Fig. 4 is also an end elevation.

Like letters of reference refer to like parts in the several views.

The nature of this invention relates to a machine for sawing spokes; and the object thereof is to cut the sides of the spokes to a gage so that they shall have a uniformity of size.

Of the construction and operation of the above-specified machine the following is a description in detail:

In the drawing, A represents a frame, in the top of which is hung the saw B on the shaft C. To the part D, Fig. 1, of the frame, is pivoted one end of the table E, whereas the opposite end is free to vibrate, and is guided in its vibratory movements by a guide, F, which the end of the table embraces, as shown in Fig. 2. The table is counterbalanced by a weight, G, attached thereto by a cord, H, passing over a pulley, I. J, Fig. 4, are two standards, in which is pivoted a dog, K, Fig. 2. To one end of the dog, is attached a lever, L, whereby the dog is operated for holding the end of a spoke. N O P, Fig. 2, are gages for holding and gaging the position of the spoke while being sized.

The above-described machine, as aforesaid, is for sizing wheel-spokes—that is to say, it is for sawing off the sides of spokes so that they shall have an equal width lengthwise the tenon, thereby producing a uniformity in the size of the spokes at that particular place.

The following is the manner of its operations:

The operator stands at the side of the machine, shown in Fig. 1, the table being elevated, as indicated by the dotted lines *a*. On the table is laid a spoke, the tenon end of which is laid under the dog at Q, Fig. 2, with the tenon resting flatwise upon the shoulder of the block R, lying immediately under the dog, and by which dog the end of the spoke is clamped down upon the block by means of the lever L. The length of the spoke is allowed to rest against the gages N O, which are so adjusted in relation to the saw as to bring the side of the tenon end of the spoke in range with it, and by which the side is then sawed off more or less on depressing the end of the table, thereby bringing the spoke upon the saw. One side of the spoke, on being cut, is then removed and again clamped on the table the other side up, so that the opposite or corresponding side of the spoke may be sawed, which is done as above described, care being taken to hold the length of the spoke against the gages so that the spoke shall lie straight with the side of the saw, and which is held thus by the gage P, between which and the two gages N O the spoke lies.

By this machine, operating as above described, I am enabled to size the tenon-end of the spokes so that an invariableness in the width thereof is obtained, and which is easily and quickly done.

*Claim.*

What I claim, and desire to secure by Letters Patent, is—

The vibrating table E, gages N O P, dog K, and lever L, in combination with the saw, in the manner substantially as and for the purpose set forth.

JOHNSTON V. WOOLSEY.

Witnesses:
W. H. BURRIDGE,
JULIUS SCHELDT.